Dec. 7, 1926.

M. PRÜSS 1,609,830

SEWAGE TREATMENT PLANT

Filed June 11, 1925    2 Sheets-Sheet 1

Witnesses:

Inventor:
Max Prüss

Dec. 7, 1926.  1,609,830
M. PRÜSS
SEWAGE TREATMENT PLANT
Filed June 11, 1925   2 Sheets-Sheet 2

Witnesses:

Inventor:
Max Prüss

Patented Dec. 7, 1926.

1,609,830

UNITED STATES PATENT OFFICE.

MAX PRÜSS, OF ESSEN, GERMANY.

SEWAGE-TREATMENT PLANT.

Application filed June 11, 1925, Serial No. 36,441, and in Germany June 19, 1924.

For its quick digestion, the sludge in sludge digestion chambers of sewage treatment plants must be kept warm and frequently agitated. With the two-storied sewage treatment plants such as Imhoff tanks and similar constructions, in which the fresh-sludge flows from the settling basins through slots into the digestion chambers underneath, the digestion chambers are kept favourably warm by the sewage flowing above the same and the sinking fresh-sludge is well mixed with already digested sludge. A drawback of such plants lies, however, in the fact that an artificial agitation of the contents of the digestion chamber, by which an increased gas generation and a quick sludge digestion is attained, is not possible by reason of its slot connection with the settling basin, while furthermore the slots, by disturbances in the digestion chamber or by careless attendance to the plant, cause easily a return of digested sludge or water from the digestion chamber into the settling basin. Therefore, attempts have been made to further treat the fresh-sludge in digestion chambers located separate from the settling basins, the result being however unsatisfactory, because the required digestion chambers must be built much larger than in two-storied plants.

In the improved plant forming the subject matter of the present invention, the advantages of the two-storied sewage treatment plants and of the hitherto known plants with separate sludge digestion are combined.

Figure 1:
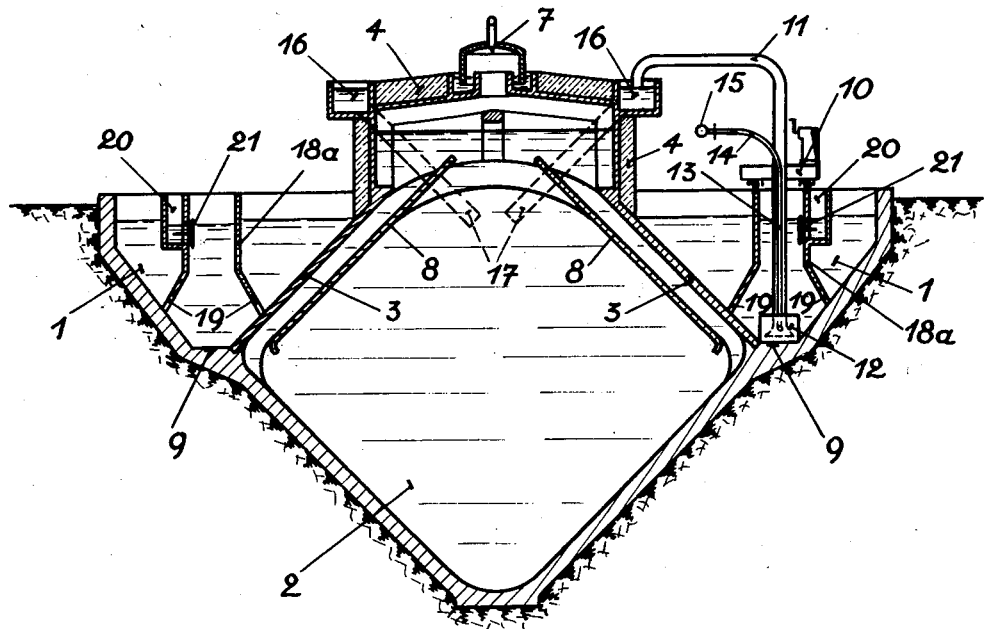
Figure 2:
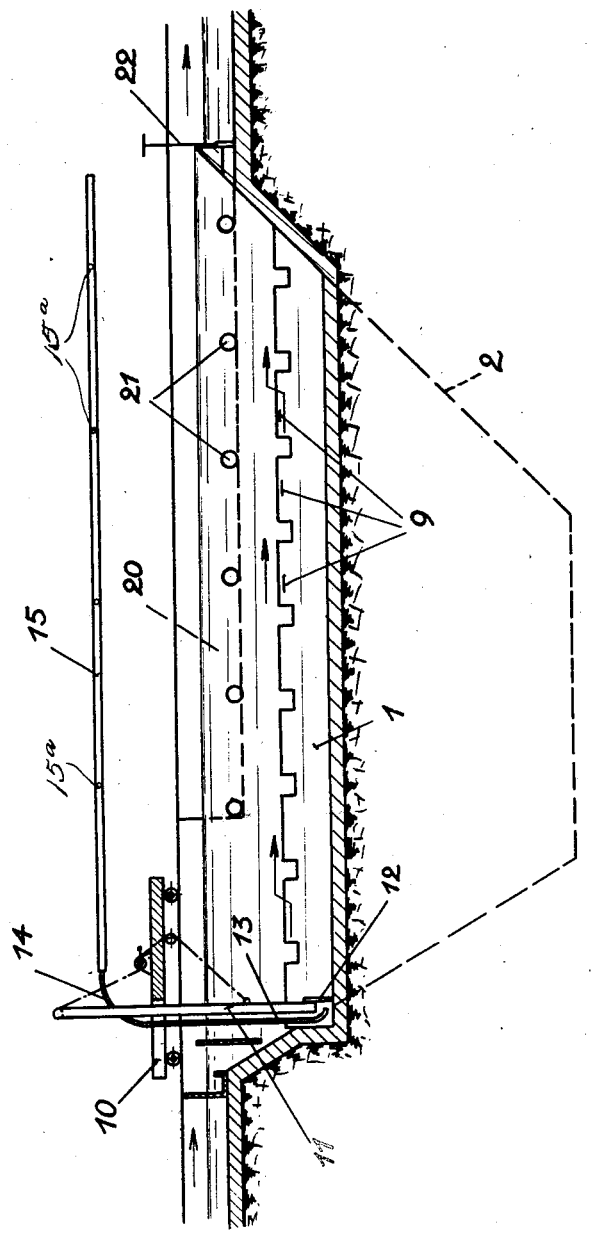

In the accompanying drawings: Fig. 1 is a cross-section through settling basins and sludge digestion chamber of a sewage treatment plant, and Fig. 2 is a longitudinal section through one of the settling basins, while Fig. 3 is a similar view to Fig. 1 showing a modification of the cross-section through the plant.

Settling basins 1 and juxtaposed digestion chamber 2 are so combined in one construction that they are separated from one another by thin walls 3 of heat-permeable material only, so that the heating of the digestion chamber by the settling basins remains as favourable as with the two-storied plants mentioned. The fresh-sludge in this arrangement must be raised artificially from the settling basins into the digestion chamber, whereby the height of the sludge level in the digestion chamber is independent of the water level in the settling basins. The digestion chamber can thus be built as high as convenient, whereby with rocky ground or with high underground water the cost of deeply extending sludge tanks is reduced. With the improved arrangement care must be taken that the boundary walls of the digestion chamber extending above the settling basins are well insulated against heat radiation, e. g. by an insulating envelope 4 shown in Figs. 1 and 3, and that, furthermore, when agitating the contents of the digestion chamber, the sludge in motion is continuously brought in contact with the heating walls 3 of the settling basins.

Figure 3:
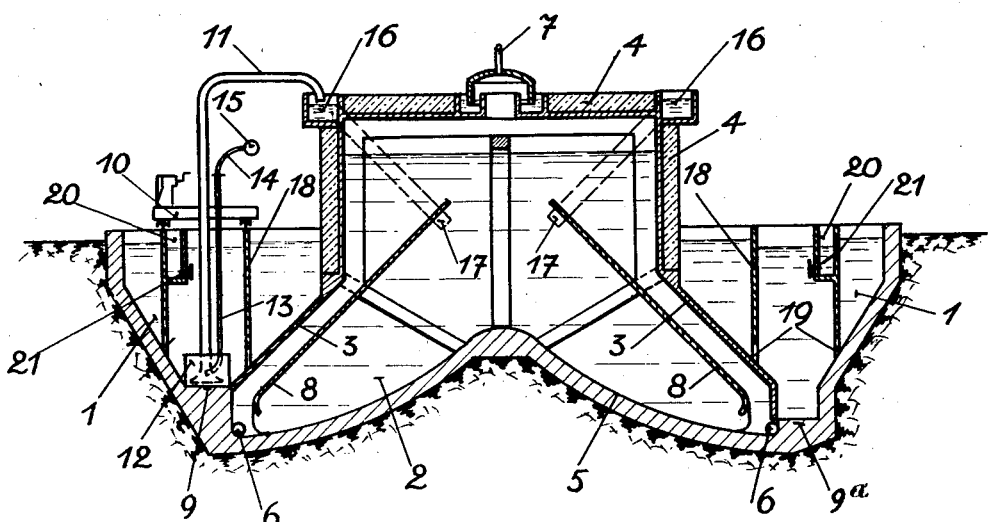

Referring to Fig. 3, the sludge flows down the shallow bottom 5 to the perforated pipes 6 through which digestion gases from the gas collector 7 are, after their passage through a compressor, forced into the sludge in a way known in the art. By said gas supply the sludge is caused to ascend along the heating walls 3 and after liberation of the gases to drop again at the middle of the digestion chamber. By the arrangement of guiding-walls 8 in the latter a short distance from the heating walls 3 and extending from the lower ends of the latter into the top part of said chamber, said artificial agitation can be increased. By heating the digestion gases prior to their supply to the pipes 6, a further increased heating of the digestion chamber can be obtained, this being known in the art. If the digestion chamber is used without artificial agitation, a natural agitation takes place with the aid of the inclined guiding-walls 8, because the sludge enriched by digestion gases ascends from the bottom of the digestion chamber along the guiding-walls 8 and extends over the whole sludge level in order to drop again after liberation of its gases; the larger portion of the sinking sludge passing through the space between the guiding-walls 8 and the heating walls 3.

In order to easily raise the fresh-sludge settled in the settling basins, from the latter into the digestion chamber, it is collected in a shallow fresh-sludge channel 9, or in a deep fresh-sludge channel $9^a$, at the bottom of the settling basin, to which it flows down along the steep side walls of the latter. Through said channel, which is narrow comparatively to the width of the basin, a sludge-pipe 11 is dragged by movable means, for instance a truck 10 running on rails above the basin, said pipe carrying behind its lower orifice a shovel 12 occupying the whole cross-section of said channel. Said shovel 12 serves, when removing the sludge by means of the pipe 11, to prevent an admission of water from the already emptied part of the channel to said pipe and thus a dilution of the sludge. The edges of the shovel are fitted with india rubber or the like, so as to tightly fit the walls of the channel 9, whereby at each passage of the shovel through the channel 9 the walls of the latter are thoroughly cleaned from fresh-sludge. This is very important for keeping the water in the basin fresh, as a long storage of fresh-sludge in the sludge channel results in a rising of said sludge and in a soiling of the settling basin. The raising of the fresh-sludge through the pipe 11 can be effected by any suitable sludge raising contrivances. In order, however, to keep the truck 10 so light that it can be easily advanced by hand, it is preferable to use the compressed-air plant illustrated, consisting of a compressed-air supply pipe 15 extending over the whole length of the basin 1 and having several closable branches 15ª to each of which a pipe 13 on the truck 10 leading into the bottom end of the sludge pipe 11 can be connected by means of a flexible pipe 14 on the upper end of said pipe 13, so that during the whole advance of the truck 10 along the settling basin compressed-air can be supplied to the sludge pipe 11 whereby the sludge is raised therein.

The pipe 11 does not lead the fresh-sludge directly into the digestion chamber but to an intermediary gutter 16, which can take-up the whole sludge contents of a basin in a short time and gradually deliver the same by gravity flow, as indicated at 17, into the digestion chamber, so that the mixing of the fresh-sludge with digested sludge remains equivalent to that in the conventional two-storied plants. Surplus water supplied through pipe 11 can settle in the gutter 16 and again be returned to the basin 1. The gutter 16 has further the important function of allowing a testing of the fresh-sludge as to its digestibility before its delivery to the digestion chamber. In industrial towns it sometimes occurs that indigestible sludge, for instance coal-sludge, is supplied to the plant, which sludge acts detrimentally in the digestion chamber and cannot be kept away from the latter in the conventional two-storied plants. Such noxious sludge can, after its inspection in the gutter 16, be directly led onto the sludge drying place, so that it does not come in contact with the contents in the digestion chamber.

The fresh-sludge is removed from the channel 9 into the gutter 16 as often as this is required for keeping the sewage clean. Generally, a removal on every second or third day will suffice. A rising of the sludge hardly occurs with domestic sewage. In case that a less frequent removal is desired or the sludge has a light buoyancy, that part of the settling basin lying above the sludge channel 9 must be separated from the remaining parts by means of perpendicular straight partition-walls 18, or bent partition-walls 18ª, extending over the whole length of the settling basin. The sludge slipping down the steep walls of the settling basin passes through slots 19 in the lower ends of said partition-walls into the fresh-sludge channel 9. At normal working of the plant, the sewage flows through the whole cross-section of the settling basin, while during the removal of the sludge from the channel 9 or upon rising of the fresh-sludge owing to retarded sludge removal, the to and off-flow of the middle part of the settling basin between the partition-walls 18 must be shut-off, so that the whole sewage is temporarily treated in the outer and inner parts only of the settling basin between the walls of the latter and the partition-walls 18 and remains thus uninfluenced by the rising sludge. At normal working of the plant, said partition-walls 18 allow further to fully utilize the lowermost parts of the cross-section in the settling basin for the treatment. With a mere horizontal flowing of domestic sewage through the settling basin, an effective treatment depth of 1½ to 2 meters only can be taken into account. By the required steep inclination of the side walls of the settling basin down to the middle sludge channel 9, the middle part of the settling basin becomes essentially deeper than 2 meters. The liquid level in said middle part between the partition-walls 18 can be kept at different height to that in the lateral parts of the settling basin, whereby, beside the longitudinally directed current in the settling basin, transversely directed up and down moving currents are created between the three parts in the settling basin, which make the whole cross-section down to the slots 19 effective for the treatment. The difference of the liquid level between the middle part and the two outer parts in the settling basin can, for instance, be attained by a gutter 20 extending into the upper part of the settling basin and leading to the outlet thereof and causing, in spite of the slots 19, a slight sinking of the level of the longitudinally directed water current in the middle part by means of a plurality of adjustable slides 21 communicating between said middle part and said gutter 20, while furthermore in this case the overflow at 22 (Fig. 2) from said middle part is located somewhat deeper than that from the two outer parts of the settling basin.

The improved combined arrangement of settling basin and digestion chamber with their accessories can also be used in connection with circular plants having a central digestion chamber and a concentric outer settling basin; the illustrations in Figs. 1 and 3 being then central cross-sections through the circular plant.

What I claim, is:—

1. In a sewage treatment plant, the combination of a settling basin and a juxtaposed digestion chamber separated from one another by thin walls of heat-permeable material, free upwardly projecting insulated walls enclosing the top part of said chamber and extending above said basin, means to artificially agitate the contents of said chamber, and sludge guiding-walls in said chamber spaced a short distance from said thin walls and extending from the lower ends of the latter into the top part of said chamber.

2. In a sewage treatment plant as specified in claim 1, a narrow fresh-sludge channel at the bottom of the settling basin, an intermediary fresh-sludge gutter at the outer top end of the digestion chamber in communication with the interior of the latter, a movable sludge-pipe extending from said channel to above said gutter, a cleaning shovel tightly fitting the walls of said channel and attached to said pipe behind the lower orifice thereof, means to raise the sludge from said channel through said pipe into said gutter, and movable means above said settling basin carrying said pipe and adapted to drag the latter with said shovel through said channel.

3. In a sewage treatment plant as specified in claim 1, a narrow fresh-sludge channel at the bottom of the settling basin, and perpendicular partition-walls with slotted lower ends in the latter separating the middle part above said channel from the two outer parts of the settling basin.

4. In a sewage treatment plant as specified in claim 1, a narrow fresh-sludge channel at the bottom of the settling basin, perpendicular partition-walls with slotted lower ends in the latter separating the middle part above said channel from the two outer parts of the settling basin, and means to keep the sewage current in said middle part at different level to that in the two outer parts.

5. In a sewage treatment plant as specified in claim 1, a narrow fresh-sludge channel at the bottom of the settling basin, perpendicular partition-walls with slotted lower ends in the latter separating the middle part above said channel from the two outer parts of the settling basin, a gutter extending into the upper part of the settling basin and leading to the outlet thereof, and a plurality of adjustable slides communicating between said middle part and said gutter, the overflow from the middle part being located deeper than that from the two outer parts of the settling basin.

In testimony whereof I have hereunto set my hand.

MAX PRÜSS.